Oct. 27, 1936.  Ö. RISZDORFER  2,059,032
EXPOSURE CONTROL FOR PHOTOGRAPHIC APPARATUS
Original Filed Oct. 23, 1930   2 Sheets-Sheet 1

Inventor:
Odon Riszdorfer,
By
Attorney

Oct. 27, 1936.  Ö. RISZDORFER  2,059,032
EXPOSURE CONTROL FOR PHOTOGRAPHIC APPARATUS
Original Filed Oct. 23, 1930   2 Sheets-Sheet 2
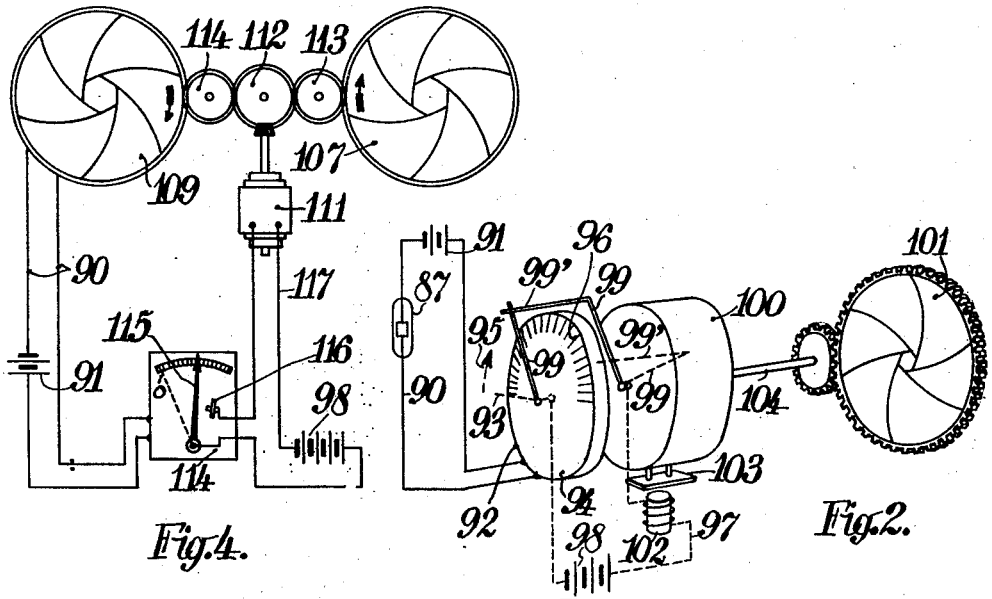
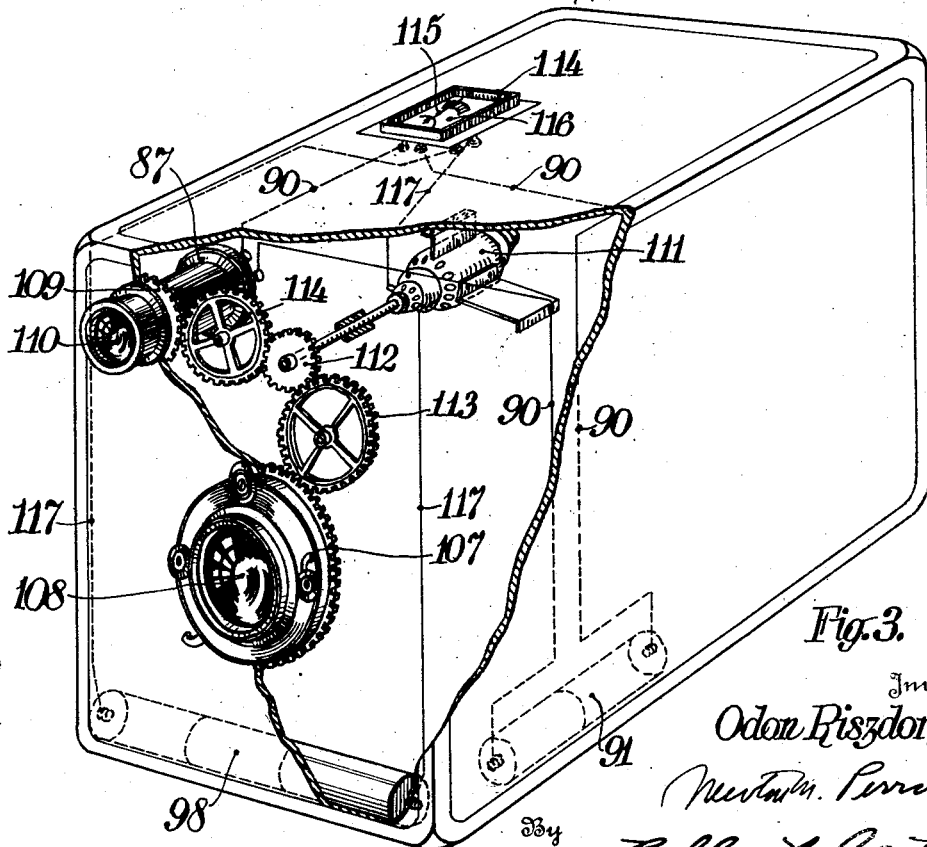
Inventor:
Odon Riszdorfer Patented Oct. 27, 1936

2,059,032

UNITED STATES PATENT OFFICE 2,059,032

EXPOSURE CONTROL FOR PHOTOGRAPHIC APPARATUS

Ödön Riszdorfer, Budapest, Hungary

Original application October 23, 1930, Serial No. 490,766. Divided and this application September 15, 1934, Serial No. 744,270. Renewed November 6, 1935. In Italy, Austria, Switzerland, and Czechoslovakia October 22, 1931

14 Claims. (Cl. 95—10)

My invention relates to light sensitive apparatus, and particularly to photographic cameras in which a light sensitive cell is employed to control the adjustment of a camera diaphragm to regulate the intensity of the light transmitted by the camera objective to a sensitive film positioned in the focal plane of the objective.

This application is a division of my application Serial No. 490,766, filed October 23, 1930 which issued September 25, 1934 as Patent No. 1,974,433.

In photographing scenes under different lighting conditions it is difficult to estimate correctly the exposure which should be used to insure the best possible results. It is an object of my invention to provide for photographic cameras a device including a light sensitive cell which will measure the intensity of the light reflected from the scene to be photographed and which translates this measurement into a setting of the camera diaphragm so that its opening will be such as to insure proper exposure when a known shutter speed is used and the sensitiveness of the film is also known. Other features and advantages of my invention will appear from the following description when read in connection with the accompanying drawings, and its scope will be pointed out in the appended claims.

Figure 2 is a diagrammatic view of the operating parts shown in Figure 1.

Figure 3 is a view similar to Figure 1 and shows a modified form of the invention.

Figure 4 shows, diagrammatically, the cooperation of the several parts shown in Figure 3.

Figure 1:
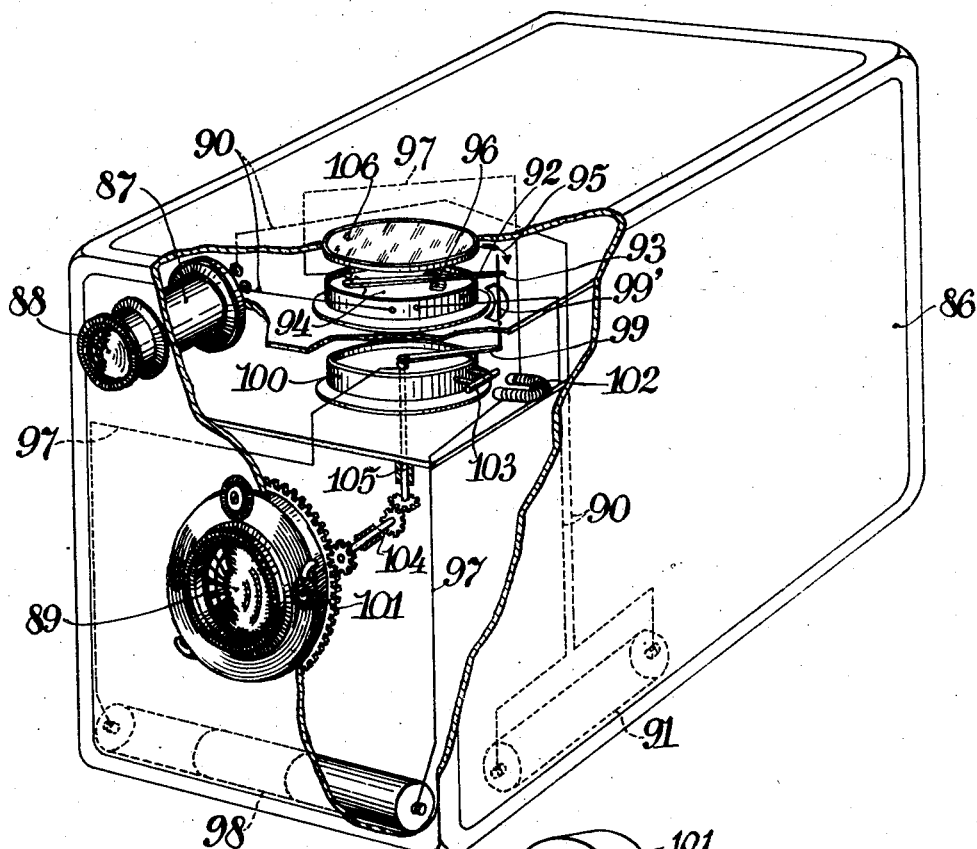
Figure 1 is a perspective view, partly broken away, showing a camera equipped with one form of the invention.

The element of the apparatus which is to be regulated automatically, for instance the diaphragm or the shutter of the object lens, may be controlled by means of a special electric circuit, whereby such circuit is connected or disconnected by a relay actuated by the current of the light sensitive cell. The relay is so constructed that the regulating action, for instance the time of the actuation of the regulating mechanism, depends upon the intensity of the current of the cell, that is to say, upon the degree of brightness. The relay is, therefore, provided with a contact element which is movably, for instance turnably mounted, and which is moved in proportion to the intensity of the current of the cell, with the result that the turning of the contact increases in accordance with the intensity of the current of the cell, in a similar manner as this is the case in measuring instruments. The counter contact may either likewise be constructed as a movable contact or, under certain conditions, be of the stationary type as hereinafter described. It is important that the regulating action depends upon the degree of turning of the first contact, which moves in proportion to the intensity of the current of the cell. This interdependence is obtained by the arrangement that this contact controls the circuit of the regulating mechanism. The regulating action, that is to say, the regulating mechanism, can either be started by hand, in which case it will be interrupted or arrested by the contact actuated by the current of the cell in a certain position (corresponding to the degree of brightness) of the element to be regulated. Or the regulating action is started by this contact and interrupted after the element to be regulated has reached the desired position.

Generally speaking, it can be said that, regardless of whether the regulating action has been started by the relay or by other means, the regulating is interrupted when the contact controlled by the current or the cell has reached its outermost position corresponding to the intensity of the current and in this position produces a contact or interrupts an already existing contact.

The interdependence between the regulating action and the intensity of the current of the cell can be established in various ways by means of two movable contacts. In this case, each time one of the contacts of the relay is moved (measured from its starting position) according to the degree of intensity of the current in the circuit of the cell. The second contact, which is arranged in the path of the first mentioned contact, may be actuated by the regulating mechanism of the element to be regulated, for instance by a clock work or an electro-motor which operates the diaphragm. The contact moved by the current of the cell takes up its position at a distance from its zero position which is proportionate to the intensity of the current of the cell. It is at this last mentioned position that the second contact which is actuated by the regulating mechanism meets the first contact which is moved by the current of the cell, whereupon the regulating action is interrupted.

The second movable contact may also be constructed that it is carried off by the first contact.

The first movable contact is moved each time for a distance which is proportionate to the intensity of the current in the circuit of the cell. The contact with the second contact is established at a predetermined minimum intensity of current, whereupon if the current of the cell further increases in intensity the second contact is taken along by the first contact, while at the same time the circuit remains closed. There now are several possibilities of controlling a regulating mechanism which is started through the establishment of contact between the two movable contacts in dependence upon the length of the path at which the first contact meets and carries off the second contact. Since, however, this path is each time proportionate to the intensity of the current of the relay it is quite possible to also produce in this way an interdependence between the intensity of the current of the relay and the course of the started regulating action.

In this case the second movable contact may be actuated by a driving mechanism, for instance a clockwork, would be started through the establishment of contact between the two contacts, and arrested after the contact has been broken. It is also quite possible to use an electrical driving mechanism which is actuated by the operating current. In an arrangement like this, the circuit of the operating current is interrupted when the first contact has swung out as far as is possible at the existing intensity of the current of the cell and stops. There also can be provided means which guide the second contact into its starting position in case the first contact moves back into its starting position.

The element to be regulated is actuated by a regulating mechanism which is started through the establishment of contact between the two contacts and which remains active as long as the contact exists, i. e. as long as the working circuit remains closed. For the actuation of the element to be regulated, for instance the diaphragm, and for the actuation of the second contact a common driving means, for instance a clockwork may be used. This driving means remains active during the time of contact, with the result that the element to be regulated is actuated in proportion to the extent of the displacement of the contacts.

Another form of the arrangement would be to also provide the light sensitive cell with a diaphragm and to regulate this diaphragm as well as the diaphragm of the camera by a common regulating mechanism which is controlled by the current of the cell, whereby the regulating action would start at an identical starting position, for instance the opened position. In an arangement like this, the second contact of the relay is preferably a stationary one and so arranged that at a minimum intensity of the current of the cell, predetermined through gauging, the contact is interrupted and the regulating action arrested.

In the arrangements shown in Figs. 1 and 2, the current of the photo-cell 87, arranged in the casing 86 and upon which the light is cast through the lens 88, serves indirectly to regulate the diaphragm ring 101 of the object lens 89, which in its position of rest is completely shut. The circuit 90 of the cell is energized by the battery 91. Arranged in this circuit is a relay 92 having a movable contact 93. The latter is shaped like a pointer and is, in known manner, moved by a moving coil, housed in the casing 94 from its zero position in the direction indicated by the arrow 95. This movement can take place over a scale 96. Contact 93 is arranged in a circuit 97, which is energized by a battery 98. The counter contact 99 is likewise a movable contact and is actuated by the regulating mechanism 100 of the diaphragm ring 101. The counter contact 99, like the contact 93, is shaped like a pointer, and contact between the two is established at the bent end 99'. The contacts 93 and 99, 99' are coaxially journaled. The regulating mechanism 100 is a clockwork. The clockwork is controlled by a magnet 102, which acts upon the armature 103 controlling an arresting means. Regulating mechanism 100 controls the diaphragm 101 by means of toothed wheels 104 and 105. An observation window is indicated by the numeral 106.

The contact 93 is out of action in its end position at the left and the contact 99 is out of action at its end position on the right. These end positions are shown in dotted lines in Figure 2. First, the cell 87 is exposed to the light whereupon contact 93 begins to move. The degree to which contact 93 swings around; in other words, the position of contact 93, corresponds to the intensity of the current of the cell. When the clockwork 100 is started by hand it will begin to open the diaphragm ring 101 out of its completely closed position until the contact 99 reaches the contact 93. When the contacts meet the circuit 90 is closed, the magnet 102 acts and the clockwork or regulating mechanism 100 is arrested. The intenser the brightness the smaller the opening diameter of the diaphragm will be set, and vice versa.

The arrangement may also be such that the diaphragm is normally completely opened and then steadily closed by the regulating mechanism. In this case both contacts are moved in the same direction, i. e. counter contact 99 will follow the contact 93 after the latter has been displaced. The intenser the brightness the further the contact 93 will swing out, and the smaller the opening diameter of the diaphragm will be, and vice versa.

Figure 2A:
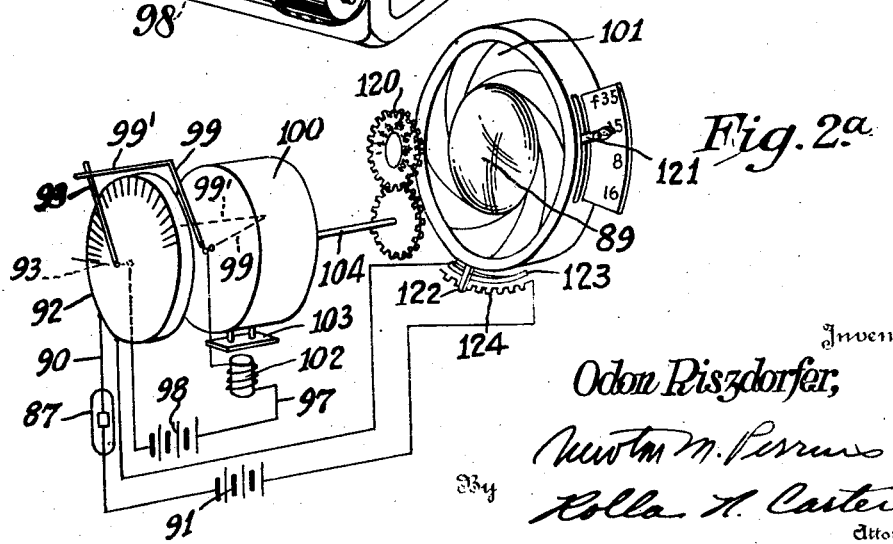
Figure 2a shows diagrammatically the arrangement of Figure 2 employed to control a shutter setting.

Under some conditions it is advantageous to make exposures with a known diaphragm opening and to control the exposure by adjustment of the exposure timing mechanism. An arrangement for regulating the shutter setting in accordance with my invention is shown in Figure 2a in which the regulating mechanism described in connection with Figure 2 is connected to a shutter speed setting disc 120 rather than to the adjusting ring of the diaphragm as shown in Figure 2. Any well known shutter mechanism (not shown) may be provided and connected to the setting disc 120 in any well known manner. The regulating mechanism including the cell 87, the movable contacts 93 and 99', the clockwork 100 and the magnet 102, functions as described above in connection with Figure 2 to rotate the shaft 104 until the magnet 102 is energized to stop the clockwork 100.

The diaphragm 101 of the camera lens 89 is provided with a suitable element 121 for adjusting its setting or opening, and this element 121 or some other element 122 which occupies a position corresponding to the setting of the diaphragm 101 may be utilized to influence the regulatign mechanism, and in the arrangement illustrated in Figure 2a the element 122 forms a contact to bridge a conducting bar 123 and a resistance 124 in the circuit 90 of the cell 87, whereby the resistance in the cell circuit depends upon the setting of the diaphragm 101. It is thus evident that the cell controlled regulating mechanism which governs the setting of the shutter speed is influenced in accordance with the diaphragm opening so that when the diaphragm 101 is set at the desired opening, the shutter will be set to give an exposure time which will result in a proper exposure being made.

In the forms of construction shown in Figures 3 and 4, two diaphragms have been provided. The diaphragm 107 of the object lens 108 is for the exposure, while the diaphragm 109 regulates the cone of light which is cast through the object lens 110 into the cell 87. The regulating mechanism which controls both of the diaphragms consists of an electro-motor 111 and toothed gear wheels 112, 113, and 114. A relay 114, actuated by the circuit of the cell 87, has a movable contact 115 shaped like a pointer, and a stationary contact 116. The latter is arranged in the path of the contact 115 in a position whose distance from the zero-position, shown in dotted lines, is empirically ascertained, but which may also be variable. The motor 111 is energized by a source of current 98. When not in operation, both diaphragms are completely open. When the circuit 90 of the cell is closed, the contact 115 engages the contact 116 with the result that the circuit 117 is closed. Then the motor 111 begins to operate and moves (by means of the toothed gear wheels 112, 113, and 114) both diaphragms 107 and 109 in the direction of the arrows, that is, in closing direction, whereupon the supply of light to the cell, and accordingly also the current in the cell, is steadily reduced. When the current in the circuit 90 has been reduced to such an extent that the contact 115 swings away from the stationary contact 116, the regulating circuit 117 is interrupted and the diaphragms are not moved any further. Then the shutter of the camera is released by hand and the plate exposed.

The invention includes still further regulating possibilities. The regulation of the diaphragm can also be made to depend upon the setting of the shutter speed, or upon the sensitiveness of the plate, in short, upon all those values which influence the time of exposure. For this purpose, the position of the contacts may be changed in such manner that contact between them will be established according to requirement after a more or less extended deflection. For instance, the starting position of the counter contact as shown in Figures 1 and 3 may be changed and made to depend upon the sensitiveness of the light sensitive emulsion used, or from the speed of the shutter or the like. There also might be arranged in the circuit of the photo-cell regulating resistances (as shown in Figure 1 of my Patent No. 1,974,433) which are controlled in dependence upon the said values.

In all of the described examples, except the one shown in Figure 2a, the element to be regulated has been the diaphragm of the object lens. However, the arrangement may just as well be such that the speed regulator of the shutter of the object lens is influenced by the regulating mechanism, in which case the ratio of gearing, the contact position, the resistance of the circuit of the cell, or the like, will be changed in dependence upon the selected opening width of the diaphragm and one suitable arrangement has been described in connection with Figure 2a. Means, for instance resistances, might also be arranged in the circuit of the light sensitive cell of the forms of construction shown in Figures 1, 2, 3, and 4, which resistances would change the intensity of current in this circuit according to the values not influenced by the current of the cell, for instance according to the shutter speed when the diaphragm is regulated by the cell, or as shown in Figure 2a according to the diaphragm when the shutter speed is regulated by the cell, or according to the sensitiveness of the plate, or according to the filters or the like that may be used.

While for convenience I have shown the camera as being of a box type and the diaphragms as being of the iris type, it will be understood that the device of my invention may be employed in conjunction with any well known type of camera and that the diaphragms may be of any suitable construction, having a movable element for regulating the transmission of light therethrough.

I have chosen the particular embodiments described above as illustrative of my invention, and it will be obvious that various other modifications may be made without departing from the spirit and scope of my invention, which modifications I intend to cover by the appended claims.

What I claim as new and desire to obtain by Letters Patent of the United States is:

1. In photographic apparatus for exposing sensitized film the combination with an adjustable light aperture, means for progressively adjusting the area of said aperture, a light sensitive element and means controlled by said element for rendering ineffective said aperture adjusting means.

2. In a camera having an objective and an adjustable diaphragm, a control member, means for adjusting the diaphragm to an opening determined by the position of the control member, and means for governing the position of said control member in accordance with the intensity of the light falling on said objective.

3. The combination with a camera having a diaphragm the opening of which is adjustable, of means for adjusting the diaphragm to vary its opening, a pointer, an electric indicating element adapted to move the pointer to a position corresponding to its energization, a photo-electric device for energizing said indicating element, and means for limiting the adjustment of said diaphragm in accordance with the position of the pointer of said indicating element.

4. The combination with a camera having a diaphragm the opening of which is adjustable, of means for adjusting the diaphragm to vary its opening, a pointer, an electric indicating element adapted to move the pointer to a position corresponding to its energization, a photo-electric device for energizing said indicating element, means for limiting the adjustment of said diaphragm in accordance with the position of the pointer of said indicating element, and a scale cooperating with said pointer for giving a visual indication of the energization of said indicating element.

5. Diaphragm adjusting apparatus including a light sensitive device, movable means for adjusting the setting of the diaphragm, means for stopping the movement of said adjusting means, a pair of cooperating contacts adapted upon engagement to actuate said stopping means, means for adjusting the position of one of said contacts in accordance with the response of said device and means controlled by said movable means for adjusting the position of the other of said contacts, whereby when the contacts engage the diaphragm setting will be a function of the activation of the light sensitive device.

6. Diaphragm adjusting apparatus including a motor element for adjusting the setting of the diaphragm, a pointer, an electric indicating element adapted to move the pointer to a position corresponding to its energization, a light sensitive cell for energizing the indicating element and means operative to discontinue the adjusting of the diaphragm when said motor element has rotated through an angle determined by the position of the pointer of said indicating element.

7. The combination with a camera having a diaphragm, a motor means connected to the diaphragm to operate the latter, electro-magnetic means controlling the operation of said motor means, a relay for closing a circuit through the electro-magnetic means, and an operating circuit for said relay including a light sensitive cell.

8. In a photographic camera having an objective and an associated diaphragm, a photo-electric device, means for varying the setting of the diaphragm, a member movable in accordance with the setting of said diaphragm, a control element adapted to be engaged by said movable member for rendering ineffective said varying means, and means for adjusting the position of said control element in accordance with the response of said device.

9. The combination with a camera having a diaphragm, of motor means connected to the diaphragm to operate the latter, electromagnetic means controlling the operation of said motor means, a relay for closing a circuit through the electromagnetic means, an operating circuit for the said relay including a light sensitive cell, a diaphragm controlling the admission of light to said cell, and an operative connection between the said last diaphragm and the motor means.

10. In a photographic camera, an objective and an associated diaphragm, a photo electric element, a pointer, an electric indicating means connected to said element and adapted to deflect the pointer to a position corresponding to the response of said element, means for adjusting the diaphragm to a setting corresponding to the deflected position of said pointer, said means including a member adapted to move into engagement with said pointer, and means for adjusting said member relatively to the diaphragm whereby different settings of the diaphragm may be obtained with a given deflection of said pointer.

11. The combination with a camera having an exposure control device the setting of which is adjustable, of means for adjusting said device to vary its setting, a pointer, an electric indicating element adapted to move the pointer to a position corresponding to its energization, a photo-electric device for energizing said indicating element, and means for limiting the adjustment of said exposure control device in accordance with the position of the pointer of said indicating element.

12. In a photographic camera having an objective and an associated exposure control device, a light sensitive cell, means for varying the setting of the exposure control device, a member movable in accordance with the setting of said device, a control element adapted to be engaged by said movable member for rendering ineffective said varying means, and means actuated by the response of said cell for adjusting the position of said control element.

13. In a photographic camera having an objective and a shutter having a speed varying mechanism, a light-sensitive cell, means for adjusting the setting of the shutter speed varying mechanism, a member movable in accordance with the setting of said mechanism, a control element adapted to be engaged by said movable member for rendering ineffective said adjusting means, and means actuated by the response of said cell for adjusting the position of said control element.

14. The combination with a camera having a diaphragm, the opening of which is adjustable, and a shutter, the setting of which is adjustable, of means for adjusting the shutter to vary its speed, a pointer, an electric indicating element adapted to move the pointer to a position corresponding to its energization, a photo-electric device for energizing said indicating element, means for limiting the adjustment of the shutter speed in accordance with the position of the pointer of said indicating element, and means for varying the energization of said indicating element in accordance with the setting of the diaphragm.

ÖDÖN RISZDORFER.